(12) United States Patent  
Lee

(10) Patent No.: US 8,602,591 B2
(45) Date of Patent: Dec. 10, 2013

(54) OPTICAL ILLUMINATION SYSTEM PRODUCING AN ASYMMETRIC BEAM PATTERN

(75) Inventor: Junwon Lee, Andover, MA (US)

(73) Assignee: OSRAM SYLVANIA Inc., Danvers, MA (US)

(*) Notice: Subject to any disclaimer, the term of this patent is extended or adjusted under 35 U.S.C. 154(b) by 356 days.

(21) Appl. No.: 13/111,440

(22) Filed: May 19, 2011

(65) Prior Publication Data

US 2011/0317413 A1 Dec. 29, 2011

Related U.S. Application Data

(60) Provisional application No. 61/359,389, filed on Jun. 29, 2010.

(51) Int. Cl.
*F21V 1/00* (2006.01)

(52) U.S. Cl.
USPC ................................. 362/235; 362/311.06

(58) Field of Classification Search
USPC ............................. 359/720; 362/235, 311.06
See application file for complete search history.

(56) References Cited

U.S. PATENT DOCUMENTS

| | | | |
|---|---|---|---|
| 7,618,163 B2 | 11/2009 | Wilcox | |
| 7,686,469 B2 | 3/2010 | Ruud et al. | |
| 2003/0099115 A1 | 5/2003 | Reill | |
| 2008/0100773 A1* | 5/2008 | Hwang et al. | 349/62 |
| 2008/0239722 A1* | 10/2008 | Wilcox | 362/268 |
| 2010/0027271 A1 | 2/2010 | Wilcox et al. | |
| 2011/0103070 A1* | 5/2011 | Zhang et al. | 362/311.02 |
| 2011/0235338 A1* | 9/2011 | Chen et al. | 362/311.02 |

FOREIGN PATENT DOCUMENTS

WO 2010138151 A1 12/2010

* cited by examiner

*Primary Examiner* — Joseph L Williams
(74) *Attorney, Agent, or Firm* — Edward S. Podszus

(57) ABSTRACT

A light fixture, such as for an overhead street light, is disclosed. A light redirection device (1) may have a central axis (CA), a front-back plane (FB) through the central axis (CA) that separates a front volume (FV) from a back volume (BV), and a left-right plane (LR) through the central axis (CA) and perpendicular to the front-back plane (FB). The light redirection device (1) may include a lens (10) for producing output light (9) skewed toward the front volume (FV). The lens (10) may have a recessed inner face (11) facing the hemisphere (3) that is generally symmetric with respect to the left-right plane (LR) and is asymmetric with respect to the front-back plane (FB). The inner face (11) may have a concave central region (CR), a convex peripheral region (PR) and an inflection zone (IZ) between the central region (CR) and the peripheral region (PR). The lens (10) may have an outer face (12) facing away from the hemisphere (3) that is generally symmetric with respect to the left-right plane (LR) and is asymmetric with respect to the front-back plane (FB). The outer face (12) may be convex or flat along the outer face (12) and may have a maximum protrusion at a location (L) laterally displaced from the central axis (CA) along the left-right plane (LR) in the front volume (FV).

15 Claims, 17 Drawing Sheets

OPTICAL ILLUMINATION SYSTEM PRODUCING AN ASYMMETRIC BEAM PATTERN

CROSS-REFERENCE TO RELATED APPLICATION

This application claims the benefit under 35 U.S.C. 119(e) of U.S. Provisional Application No. 61/359,389, filed Jun. 29, 2010, and titled "Optics Having Free Form Inner and Outer Surfaces".

TECHNICAL FIELD

The present disclosure relates to an optical illumination system that produces an asymmetric beam pattern.

BACKGROUND

For overhead street lighting, it is desirable that the street be generally symmetrically illuminated, so that one side of the street is not significantly brighter than the other side. It is also desirable that the light that produces such illumination may be located relatively close to one side of the street, so that the pole that suspends it above the street need not extend halfway across the street. While overhead street lighting is used as an example, it should be recognized that there are many other applications where asymmetrically distributed illumination is desireable.

As a result, there exists a need for an optical system that can produce asymmetrically distributed illumination.

Furthermore, as light emitting diodes (LEDs) become more commonplace and less expensive in general illumination applications, it may be desirable to incorporate LEDs as the light sources in overhead street lighting and other systems.

Accordingly, there exists a need for an optical system using an LED light source that can produce asymmetrically distributed illumination.

SUMMARY

An illustrative embodiment is a light redirection device (1) having a central axis (CA), a front-back plane (FB) through the central axis (CA) that separates a front volume (FV) from a back volume (BV), and a left-right plane (LR) through the central axis (CA) and perpendicular to the front-back plane (FB). The light redirection device (1) includes at least one light emitting diode (2) for producing diverging light (7) centered about the central axis (CA). The light redirection device (1) also includes a hemisphere (3) for receiving the diverging light (7) and producing incident light (8). The light redirection device (1) also includes a lens (10) adjacent to and spaced apart by air from the hemisphere (3) for receiving the incident light (8) and producing output light (9) skewed toward the front volume (FV). The lens (10) has a recessed inner face (11) facing the hemisphere (3) that is generally symmetric with respect to the left-right plane (LR) and is asymmetric with respect to the front-back plane (FB). The inner face (11) has a concave central region (CR), a convex peripheral region (PR) and an inflection zone (IZ) between the central region (CR) and the peripheral region (PR). The lens (10) has an outer face (12) facing away from the hemisphere (3) that is generally symmetric with respect to the left-right plane (LR) and is asymmetric with respect to the front-back plane (FB). The outer face (12) is convex or flat along the outer face (12) and has a maximum protrusion at a location (L) laterally displaced from the central axis (CA) along the left-right plane (LR) in the front volume (FV).

In some cases, the at least one light emitting diode (2) may be disposed at or near a center of the hemisphere (3) and may face a flat surface (4) of the hemisphere (3). In some cases, a curved surface (5) of the hemisphere (3) may face the inner face (11) of the lens (10).

In some cases, the inner face (11) may have an on-axis depth (D). In some cases, in a cross-section taken along the left-right plane (LR), the peripheral region (PR) of the inner face (11) may be displaced away from the central axis (CA) by 40% to 80% of the on-axis depth (D) of the inner face (11) in the front volume (FV) and by more than the on-axis depth (D) of the inner face (11) in the back volume (BV). In some cases, in a cross-section taken along the front-back plane (FB), the inflection zone (IZ) may be displaced away from the central axis (CA) by 40% to 80% of the on-axis depth (D) of the inner face (11) and the peripheral region (PR) may extend radially away from the central axis (CA) by 40% to 80% of the on-axis depth (D) of the inner face (11).

In some cases, the front-back plane (FB) may divide the outer face into a front portion (FP) and a back portion (BP). In some cases, the outer face (12) may have an on-axis thickness (T). In some cases, in a cross-section taken along the left-right plane (LR), the front portion (FP) may extend radially away from the central axis (CA) by more than the on-axis thickness (T) and the back portion (BP) may extend radially away from the central axis (CA) by less than the on-axis thickness (T). In some cases, in a cross-section taken along the front-back plane (FB), the outer face (12) may be convex or flat everywhere and may extend radially away from the central axis (CA) by more than the on-axis thickness (T).

In some cases, the inner face (11) may have an interior (I) bounded by the inner face (11) and an inner-facing plane (19) of the lens (10). In some cases, at or near the central axis (CA), the inner face (11) may have a center of curvature within the interior (I) of the inner face (11). In some cases, for at least one point on the outer face (12), the outer face (12) may have a center of curvature outside the lens (10) and beyond the inner-facing plane (19) of the lens (10).

Another illustrative embodiment is a light redirection device (1) having a central axis (CA), a front-back plane (FB) through the central axis (CA) that separates a front volume (FV) from a back volume (BV), and a left-right plane (LR) through the central axis (CA) and perpendicular to the front-back plane (FB). The light redirection device includes a lens (10) for receiving incident light (8) centered around the central axis (CA) and transmitting output light (9) skewed toward the front volume (FV). The lens (10) has an inner plane (IP) facing the incident light (8). The lens (10) has an inner face (11) recessed into the inner plane (IP). The inner face (11) has an on-axis depth (D) equal to the distance between the inner plane (IP) and the intersection of the inner face (11) with the central axis (CA). The inner face (11) is concave in a central region (CR) surrounding the central axis (CA). The inner face (11) has an inflection zone (IZ) surrounding the central region (CR). The inner face (11) is convex in a peripheral region (PR) surrounding the inflection zone (IZ). In a cross-section taken along the left-right plane (LR), the peripheral region (PR) is displaced away from the central axis (CA) by 40% to 80% of the on-axis depth (D) of the inner face (11) in the front volume (FV) and by more than the on-axis depth (D) of the inner face (11) in the back volume (BV). In a cross-section taken along the front-back plane (FB), the inflection zone (IZ) is displaced away from the central axis (CA) by 40% to 80% of the on-axis depth (D) of the inner face (11) and the peripheral region (PR) extends radially away from the central axis (CA) by 40% to 80% of the on-axis depth (D) of the inner face (11). The lens (10) having an outer face (12) opposite the inner face (11). The outer face (12) has an on-axis thickness (T) equal to the distance between the inner plane (IP) and the intersection of the outer face (12) with the central axis (CA). The outer face (12) has a front portion (FP) in the front volume (FV) that is convex everywhere. The outer face (12) has a back portion (BP) in the back volume (BV) that is convex or flat everywhere. The front portion (FP) of the outer face (12) includes only one location (L) at which the outer face is perpendicular to the central axis (CA), said location (L) being laterally displaced away from the central axis (CA) along the front-back plane (FB). In a cross-section taken along the left-right plane (LR), the front portion (FP) extends radially away from the central axis (CA) by more than the on-axis thickness (T) and the back portion (BP) extends radially away from the central axis (CA) by less than the on-axis thickness (T). In a cross-section taken along the front-back plane (FB), the outer face (12) is convex or flat everywhere and extends radially away from the central axis (CA) by more than the on-axis thickness (T).

In some cases, the lens (10) may be generally symmetric about the left-right plane (LR) and asymmetric about the front-back plane (FB).

In some cases, the inner face (11) may have an interior (I) bounded by the inner face (11) and the inner plane (IP). In some cases, at or near the central axis (CA), the inner face (11) may have a center of curvature within the interior (I) of the inner face (11).

In some cases, for at least one point on the front portion (FP) of the outer face (12), the outer face (12) may have a center of curvature outside the lens (10) and beyond an inner-facing plane (19) of the lens (10).

In some cases, the light redirection device (1) may also include at least one light emitting diode (2) that produces diverging light (7). In some cases, the light redirection device (1) may also include a hemisphere (3) for receiving the diverging light (7) and producing the incident light (8). In some cases, the at least one light emitting diode (2) may be disposed at or near a center of the hemisphere (3). In some cases, a curved surface (5) of the hemisphere (3) may be directly adjacent to and spaced apart by air from the inner face (11) of the lens (10). In some cases, the diverging light (7) and the incident light (8) may both be rotationally symmetric about the central axis (CA). In some cases, the incident light (8) may be distributed more narrowly than the diverging light (7).

In some cases, the lens (10) may be bounded by the inner and outer faces (11, 12), a pair of generally parallel planar flanges (IP, OP) extending laterally from the peripheries of the inner and outer faces (11, 12), respectively, and by a generally cylindrical face (15) connecting the flanges that defines a lateral edge of the lens (10).

Another illustrative embodiment is a method for redirecting light having a central axis (CA), a front-back plane (FB) through the central axis (CA) that separates a front volume (FV) from a back volume (BV), and a left-right plane (LR) through the central axis (CA) and perpendicular to the front-back plane (FB). The diverging light (7) is received, the diverging light (7) being rotationally symmetric about the central axis (CA). The diverging light (7) is narrowed through a hemisphere (3) to form incident light (8). The incident light (8) is transmitted from the hemisphere (3) through air. The incident light (8) is received at an inner face (11) of a lens (10). The inner face (11) is generally symmetric with respect to the left-right plane (LR) and is asymmetric with respect to the front-back plane (FB). The received incident light (8) is refracted through the inner face (11) of the lens (10) to form internal light. The internal light is skewed toward the front volume (FV). The internal light is transmitted to an outer face (12) of the lens (10). The outer face (12) is generally symmetric with respect to the left-right plane (LR). The outer face (12) is asymmetric with respect to the front-back plane (FB). The outer face (12) is convex or flat on the outer face (12). The transmitted internal light is refracted through the outer face (12) of the lens (10) to form output light (9). The output light (9) is skewed toward the front volume (FV). The output light (9) is transmitted from the lens (10).

In some cases, the inner face (11) may have a concave central region (CR) and a convex peripheral region (PR). In some cases, the outer face (12) may have a maximum protrusion at a location (L) laterally displaced from the central axis (CA) along the left-right plane (LR) in the front volume (FV).

BRIEF DESCRIPTION OF THE DRAWINGS

The foregoing and other objects, features and advantages disclosed herein will be apparent from the following description of particular embodiments disclosed herein, as illustrated in the accompanying drawings in which like reference characters refer to the same parts throughout the different views. The drawings are not necessarily to scale, emphasis instead being placed upon illustrating the principles disclosed herein.

DETAILED DESCRIPTION

In this document, the directional terms "up", "down", "top", "bottom", "side", "lateral", "longitudinal" and the like are used to describe the absolute and relative orientations of particular elements. For these descriptions, it is assumed that the light fixture is mounted overhead, such as at the top of a lamp post, and that the light fixture directs its output generally downward toward a street. It will be understood that while such descriptions provide orientations that occur in typical use, other orientations are certainly possible. For instance, the fixture may be side-mounted or incorporated into additional elements to provide indirect lighting. The noted descriptive terms, as used herein, still apply to the fixture, even if the fixture has an orientation other than overhead, or is uninstalled in its overhead orientation.

Figure 1:
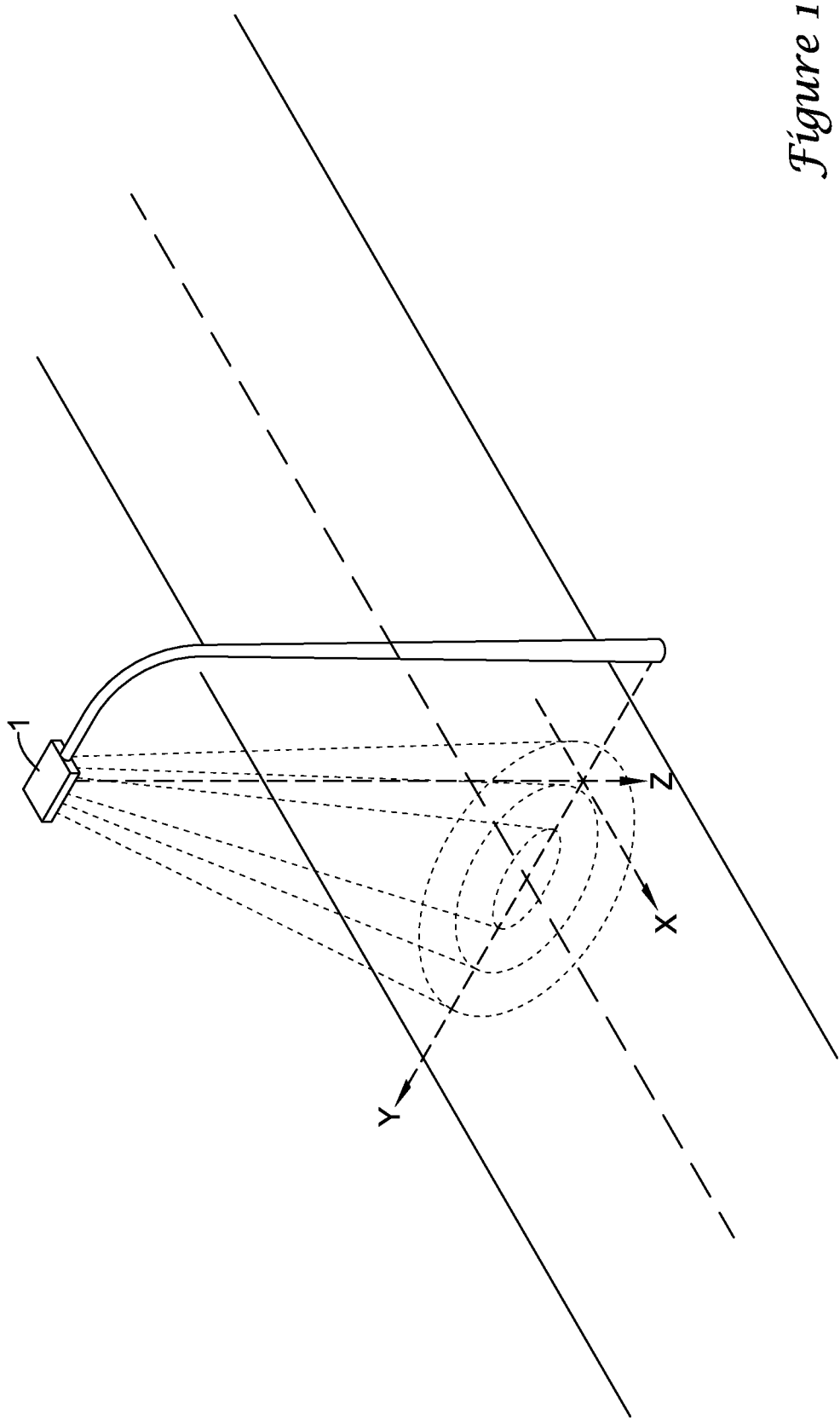
FIG. 1 is a perspective drawing of an example overhead light fixture.

FIG. 1 is a perspective drawing of an example overhead streetlight fixture, which includes a light redirection device 1. In this example, the fixture is supported at the top of a lamp post, which extend over a street, and extends laterally only partially into the street. It will be understood that using the light redirection device 1 in an overhead street lamp is just one application, and that the light redirection device 1 may be used for other suitable applications.

FIG. 1 includes a coordinate system that is used throughout this document. In this (x, y, z) coordinate system, x is parallel to a curb of the street (which may be referred to as a longitudinal direction with respect to the street), y is lateral across the street, and z is downward or into the pavement of the street. There is no inherent significance to these choices for x, y and z, other than convenience.

Figure 2:
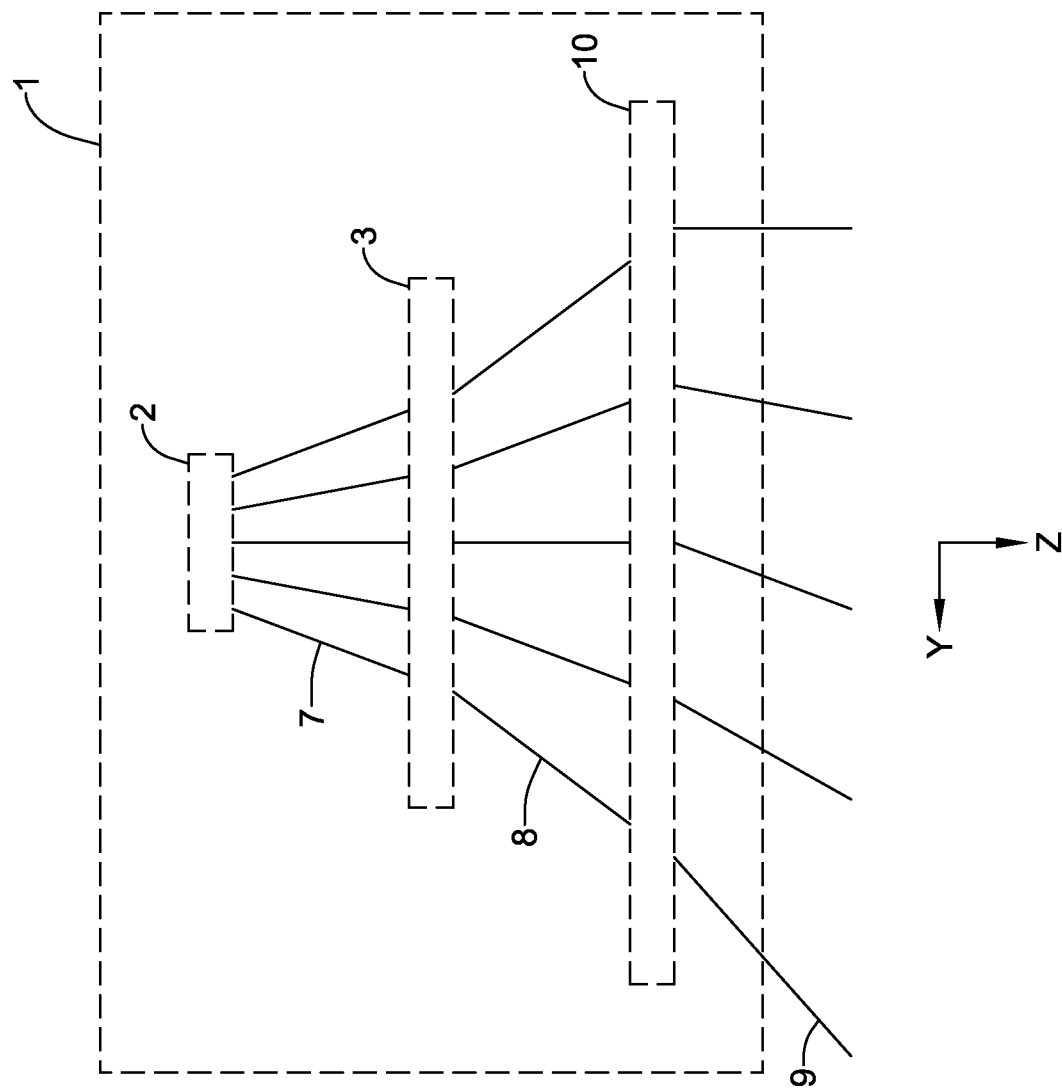
FIG. 2 is a schematic drawing of the light redirection device included with the overhead light fixture of FIG. 1.

FIG. 2 is a schematic drawing of the light redirection device 1 included with the overhead light fixture of FIG. 1. Element 2 is a light emitting diode (LED), or a suitable array of light emitting diodes (LEDs). The LEDs 2 may be supplied electrical power from an electrical control system, which is not shown in FIG. 2. The LEDs 2 produce diverging light 7.

Element 3 is a hemisphere, which may receive the diverging light 7 and produce incident light 8. Note that the divergences of the diverging light 7 and the incident light 8 are shown in FIG. 2 as being different. In general, the relative amount of beam divergence depends on the longitudinal position of the hemisphere. For instance, if the LEDs 2 are positioned at or near the center of the hemisphere, then the incident light 8 may diverge less than the diverging light 7. There are other longitudinal positions at which the incident light may be roughly collimated or may converge.

The incident light 8 is referred to as incident because it is incident on element 10 is a lens. The lens 10 may receive the incident light 8 and may transmit output light 9. Note that the diverging light 7 and incident light 8 may be generally symmetric, and that the output light 9 may be generally asymmetric, or skewed to one side. Such asymmetry may be desirable for an overhead street light application, in which the brightest spot on the pavement is laterally translated away from directly underneath the lamp. Much of the remainder of this document is dedicated to describing the lens 10 and its various surfaces.

In general, the expression "generally symmetric" is intended to imply symmetry to within typical manufacturing, alignment, and operating tolerances. An element that is generally symmetric about a particular plane should look essentially the same on both sides of the plane; for the purposes of this document, small departures from symmetry, whether in a localized region or a broad region, do not prevent an element or a beam from being generally symmetric.

Figure 3:
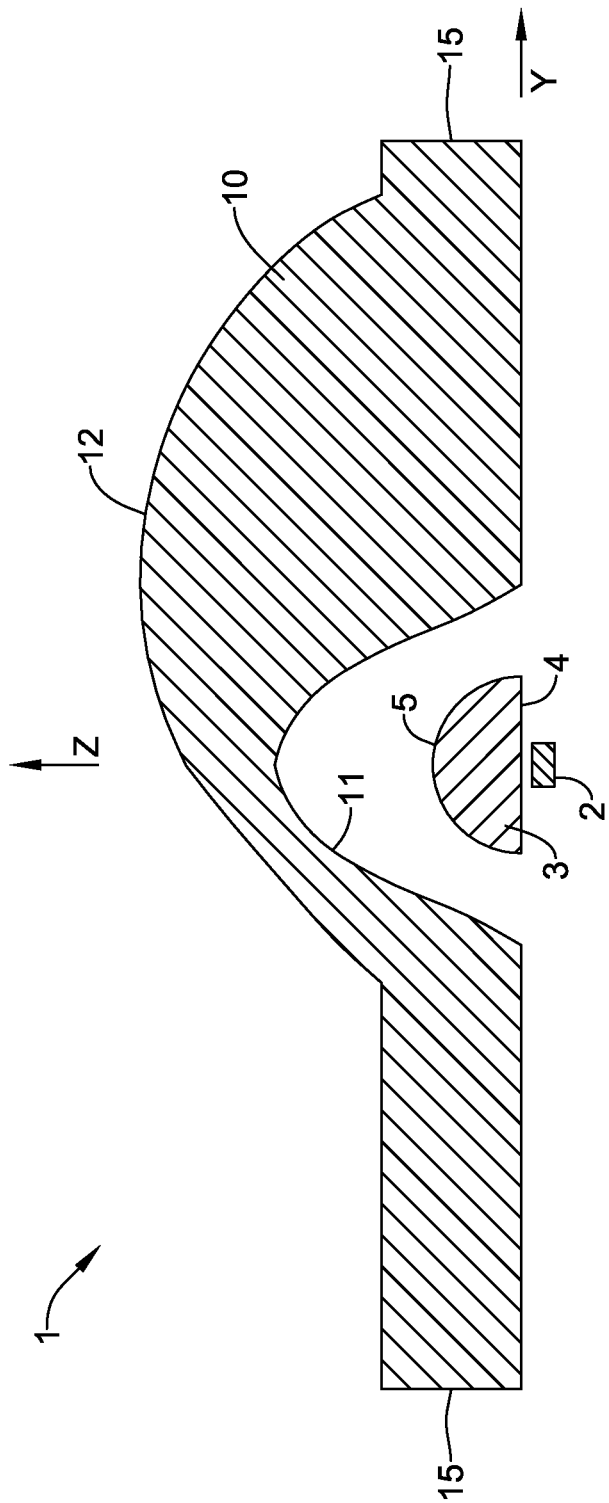
FIG. 3 is a cross-sectional drawing in the Y-Z plane of the light redirection device of FIG. 2.

FIG. 3 is a cross-sectional drawing in the Y-Z plane of the light redirection device 1 of FIG. 2. The light direction device 1 includes at least one LED 2 located at or near the center of the hemisphere 3. The hemisphere 3 has a flat surface 4 facing the LEDs 2 and a curved surface 5 facing away from the LEDs. In some cases, the hemisphere 3 is made from glass or molded plastic. In some cases, the hemisphere 3 is anti-reflection coated on one or both sides.

In some cases, the LEDs 2 may be disposed at or near a center of the hemisphere 3 and may face a flat surface 4 of the hemisphere 3. In some cases, a curved surface 5 of the hemisphere 3 may face an inner face 11 of the lens 10.

The lens 10 has an inner face 11 facing the LEDs 2 and hemisphere 3, and an outer face 12 facing away from the LEDs 2 and hemisphere. The inner 11 and outer faces 12 are shown in much more detail in the figures that follow. There is also a cylindrical face 15 around a lateral perimeter of the lens 10, which may be helpful for handling or mounting the lens 10, but may play a limited role in the optical functions of the lens 10.

For the purposes of this document, the Z-axis may be referred to as a "central" axis CA of the light redirection device 1.

Figure 4:
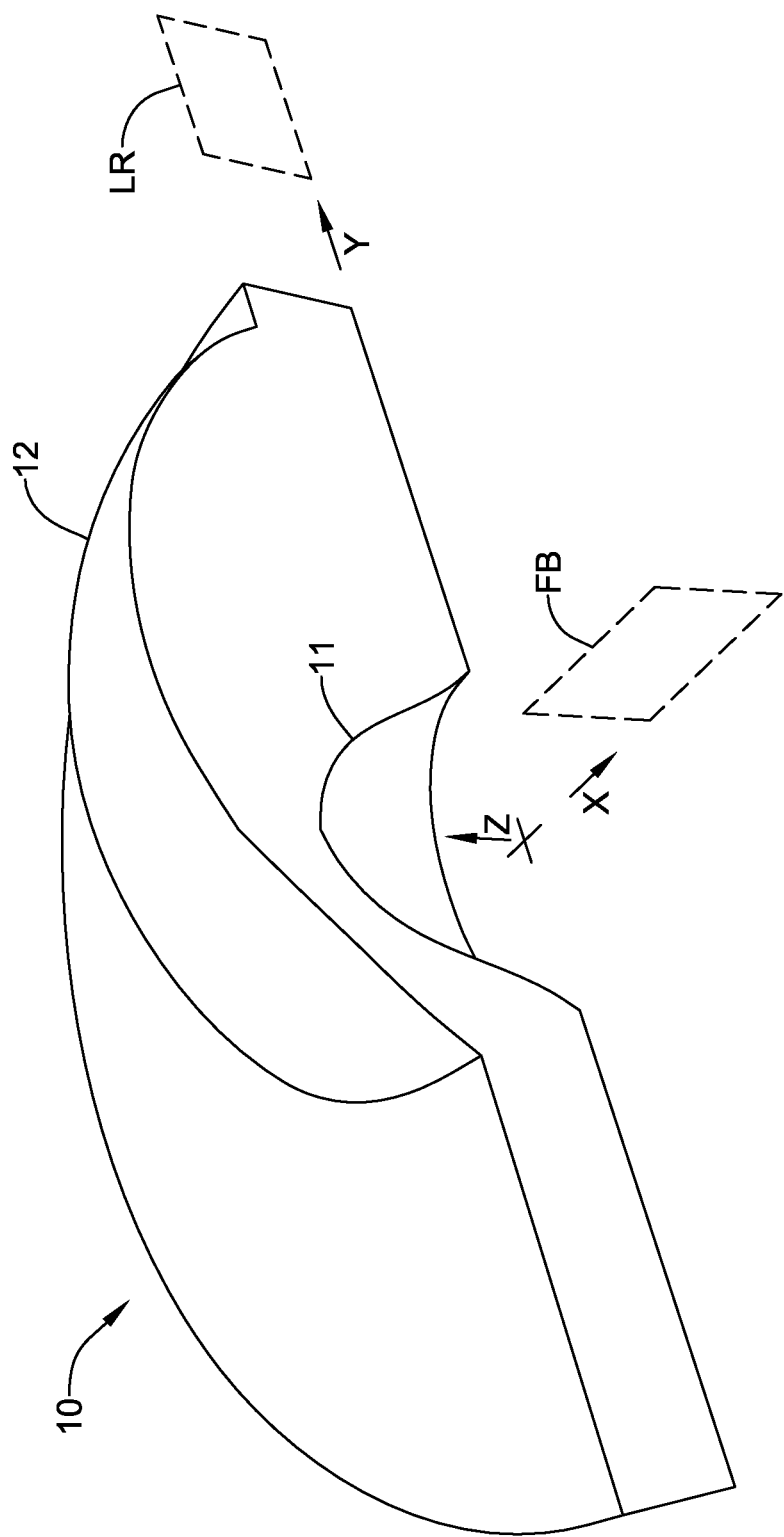
FIG. 4 is a cutaway view of the Y-Z plane of the lens of FIG. 3.
Figure 5:
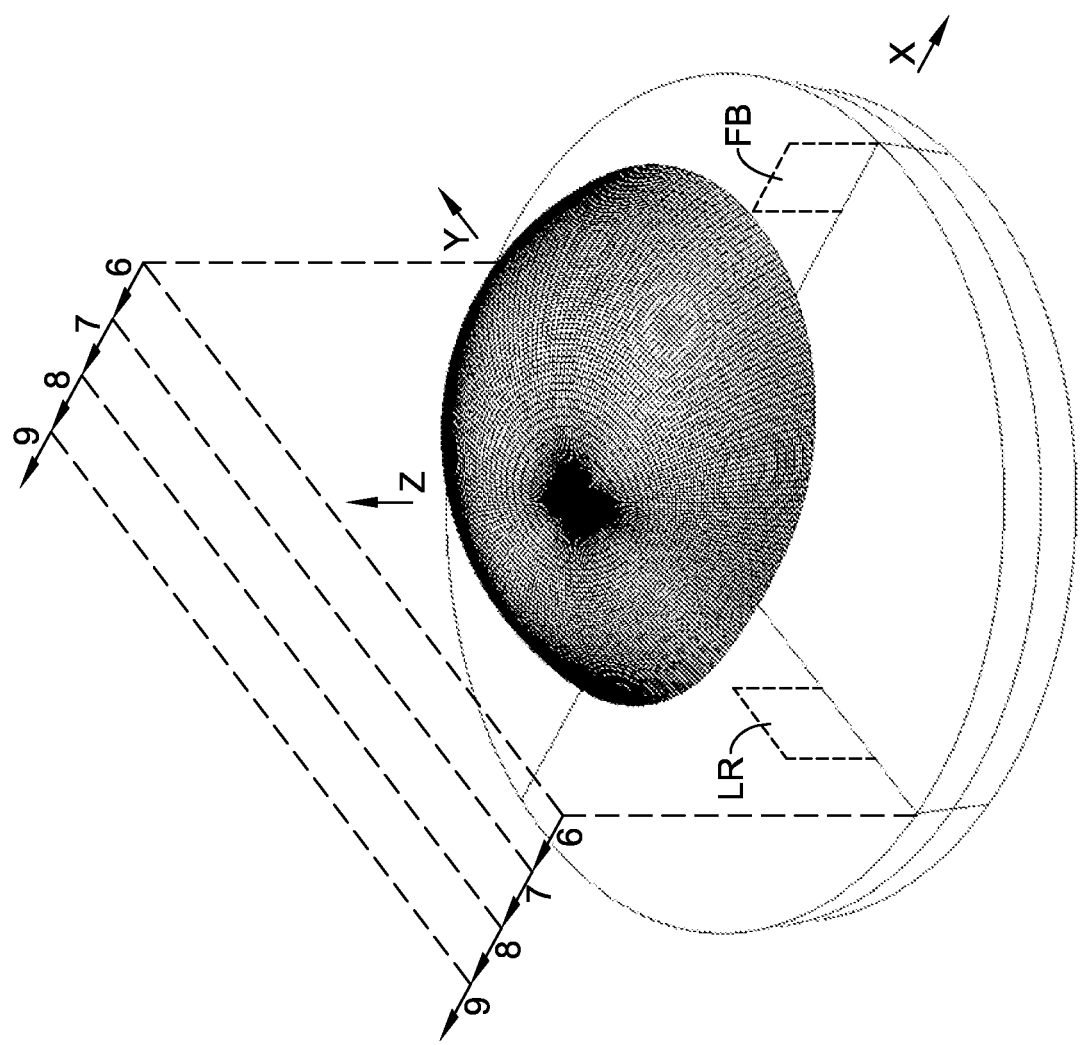
FIG. 5 is a perspective drawing of the lens of FIG. 3.

FIG. 4 is a cutaway view of the Y-Z plane of the lens 10 of FIG. 3. FIG. 4 shows several geometrical constructs that are helpful in describing the inner 11 and outer 12 faces of the lens 10.

The X-Z plane may be referred to as a "front-back" plane, with a designation of FB. The front-back plane FB divides the lens 10 into a front volume, including everything in the region of Y being greater than zero, and a back volume, including everything in the region of Y being less than zero. In general, the features of the outer face 12 of the lens 10 are shifted toward the front volume, compared to those of the inner face 11. The light output from the lens 10 is skewed toward the front volume as well, as shown in FIGS. 1 and 2.

The Y-Z plane may be referred to as a "left-right" plane, with a designation of LR. Similarly, the left-right plane divides the lens into a left volume and a right volume. Typically, the lens 10 is left-right symmetric, so that the left-right plane LR symmetrically splits the lens 10 down the middle.

Figure 6:
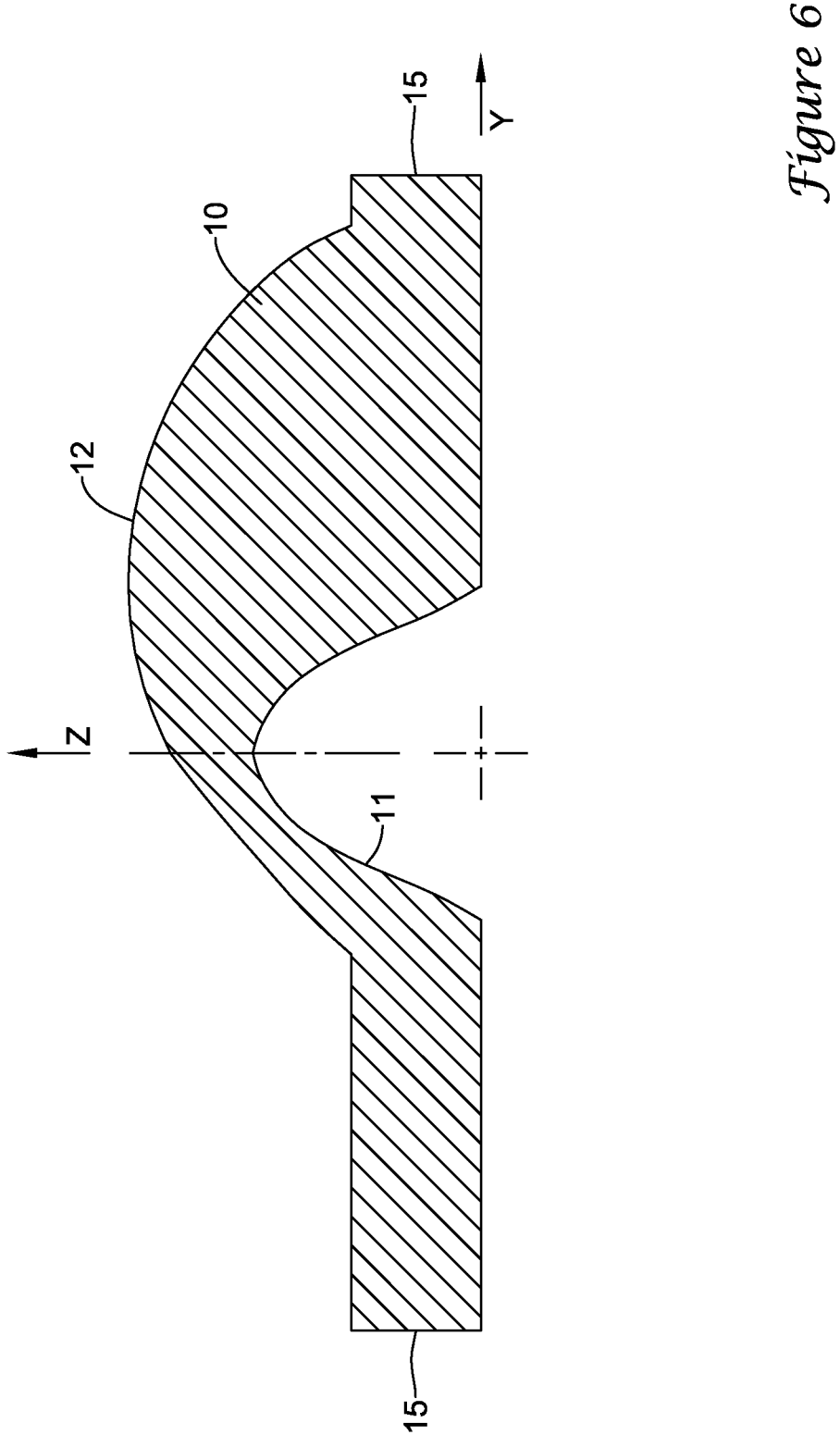
FIG. 6 is a cross-sectional drawing of the lens of FIG. 5, taken through the left-right plane L-R.
Figure 7:
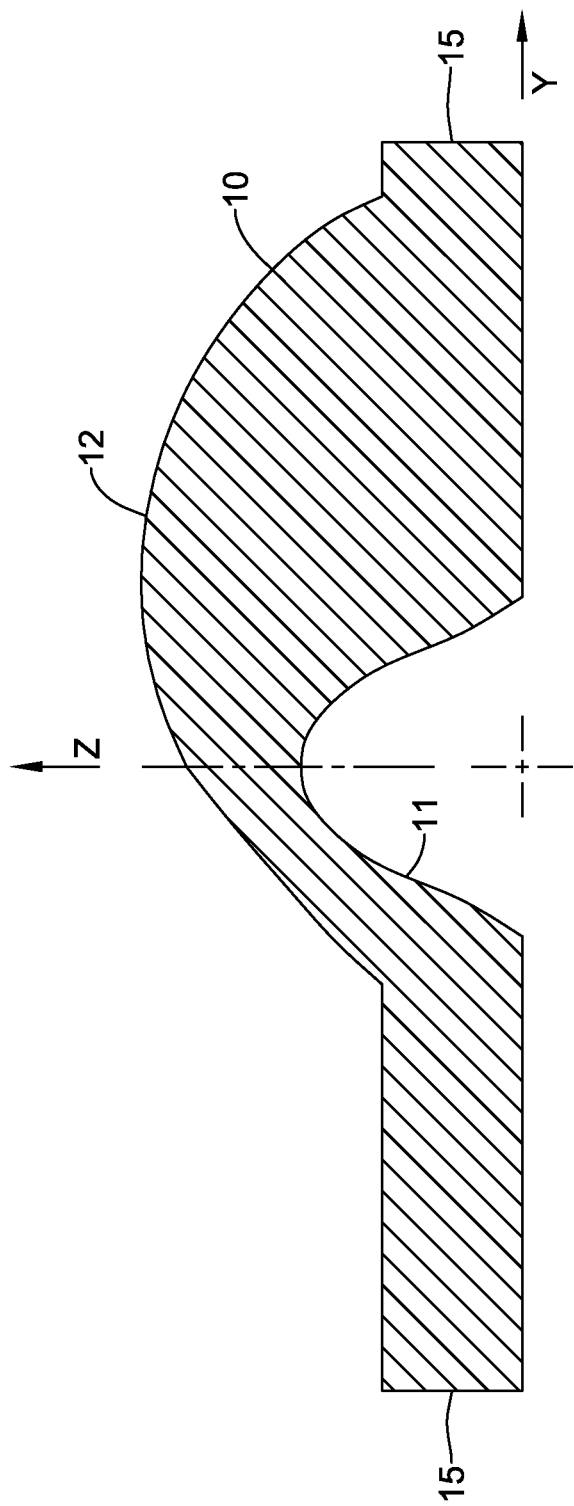
FIG. 7 is a cross-sectional drawing of the lens of FIG. 5, taken through a plane parallel to the left-right plane L-R.
Figure 8:
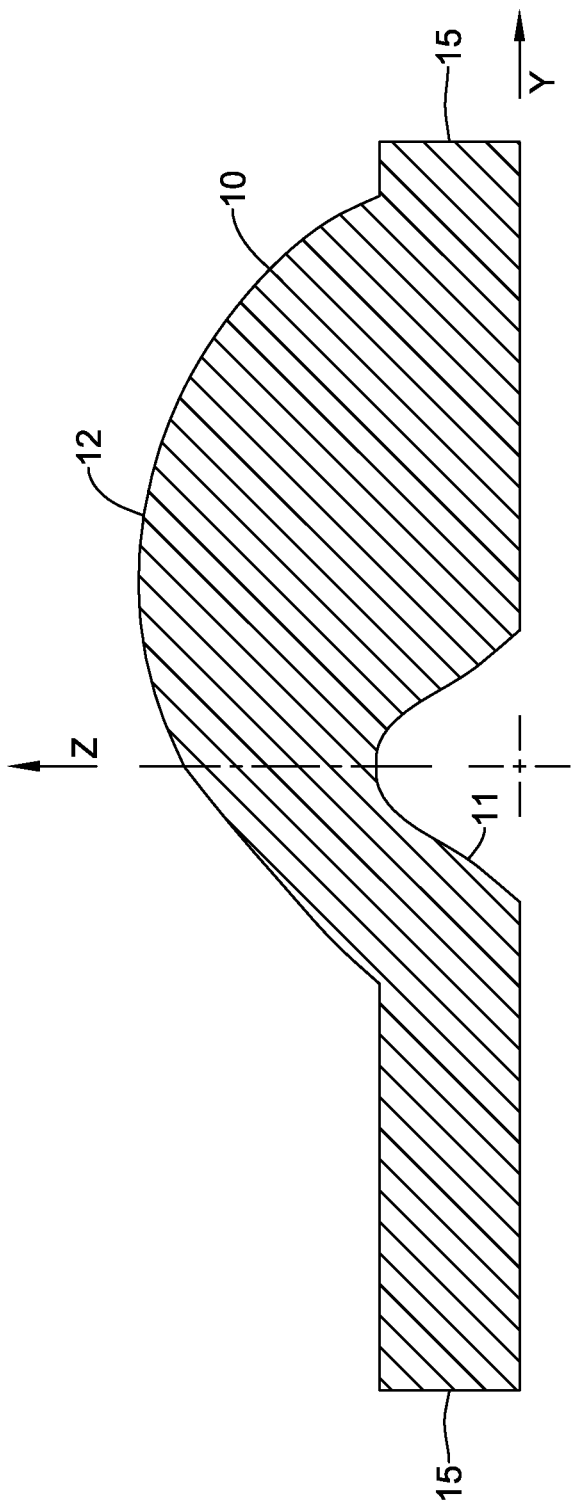
FIG. 8 is a cross-sectional drawing of the lens of FIG. 5, taken through another plane parallel to the left-right plane L-R.
Figure 9:
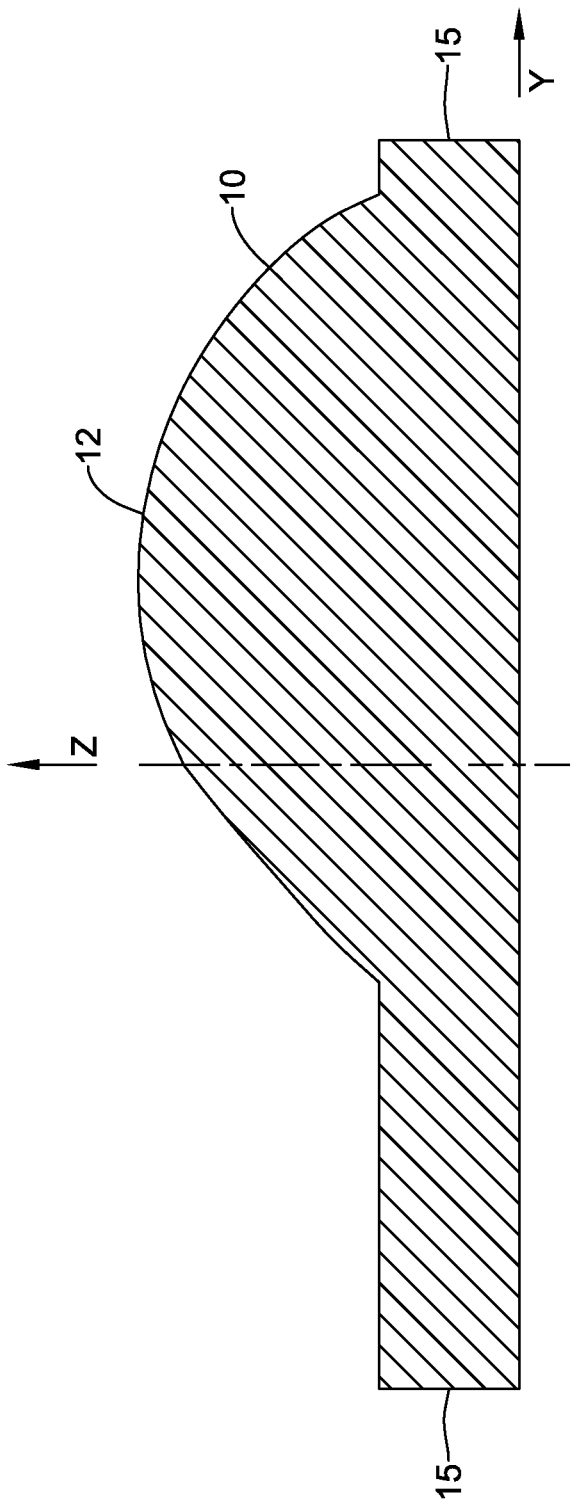
FIG. 9 is a cross-sectional drawing of the lens of FIG. 5, taken through another plane parallel to the left-right plane L-R.

The lens 10 may be left-right symmetric, but it may not be front-back symmetric. FIGS. 5 through 9 show a perspective view and four cross-sectional views of the lens 10 to more clearly show the features and shapes of the inner 11 and outer 12 faces of the lens 10. FIG. 6 is a cross-sectional drawing of the lens of FIG. 5, taken through the left-right plane LR, and FIGS. 7 through 9 are cross-sections at increasing distances away from the left-right plane LR.

It may be helpful to quantify some aspects of the shapes of the inner face 11 and outer face 12. FIGS. 10 through 13 show cross-sections of the inner 11 and outer 12 faces of the lens 10, taken along the front-back FB and left-right LR planes. FIG. 14 provides a diagrammatical description of the many geometrical constructs used to describe the lens surfaces; the reader is highly encouraged to refer to FIG. 14 for explanation of the myriad terms.

Figure 10:
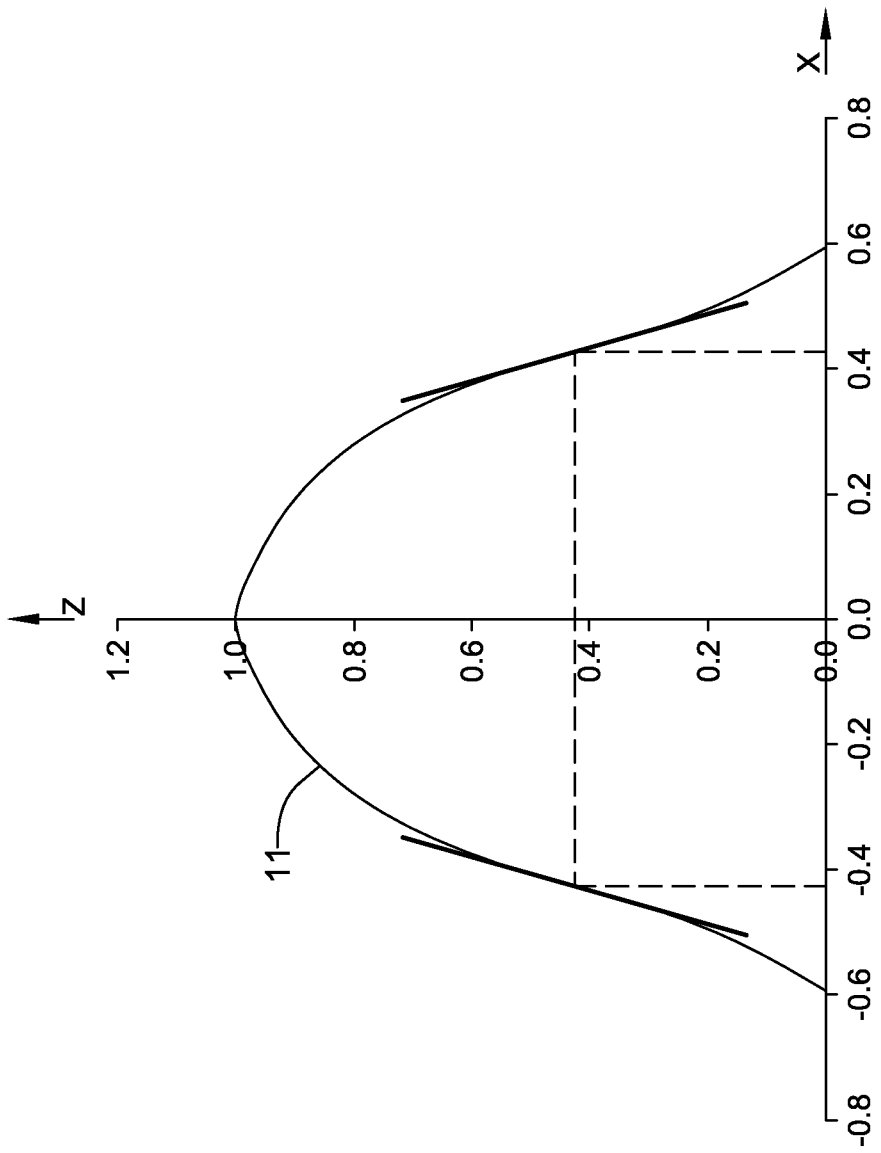
FIG. 10 is a plot of the surface profile of the inner face of the lens of FIG. 5, taken in cross-section through the X-Z plane.

FIG. 10 is a plot of the surface profile of the inner face 11 of the lens 10, taken in cross-section through the front-back plane FB, or, equivalently, the X-Z plane. The lens 10 has a recessed inner face 11 facing the hemisphere 3 that is left-right symmetric about the left-right plane LR. In terms of FIG. 10, such left-right symmetry is evident as being symmetric about the Z-axis of the plot.

The inner face 11 may have a concave central region CR, a convex peripheral region PR and an inflection zone IZ between the central region CR and the peripheral region PR. The dark lines in FIG. 10 show local surface tangents to the inner surface 11 at the inflection zones IZ.

In some cases, the inner face 11 may have an on-axis depth D, which is normalized to a value of unity along the vertical axis. In some cases, the inflection zone IZ may be displaced away from a central axis CA by 40% to 80% of the on-axis depth D of the inner face 11. In some cases, the peripheral region PR may extend radially away from the central axis CA by 40% to 80% of the on-axis depth D of the inner face 11.

Figure 11:
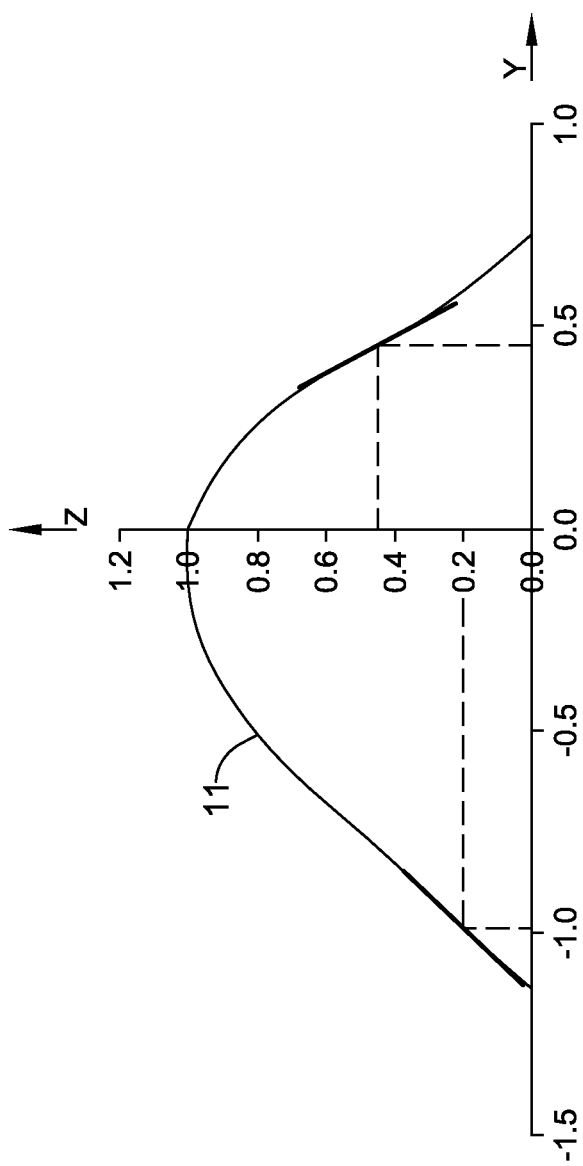
FIG. 11 is a plot of the surface profile of the inner face of the lens of FIG. 5, taken in cross-section through the Y-Z plane.

FIG. 11 is a plot of the surface profile of the inner face 11 of the lens 10, taken in cross-section through the left-right plane LR, or, equivalently, the Y-Z plane. The recessed inner face 11 may not be front-back symmetric about the front-back plane FB. In FIG. 11, the front volume FV of the lens extends from the Z-axis to the right (Y>0), while the back volume BV of the lens extends front the Z-axis to the left (Y<0).

In the front volume FV (Y>0), the peripheral region PR of the inner face 11 may be displaced away from the central axis CA by 40% to 80% of the on-axis depth D. In the back volume BV (Y<0), the peripheral region PR of the inner face 11 may be displaced away from the central axis CA by more than the on-axis depth D. In some cases, this displacement may be equal to or slightly less than the on-axis depth D, as evidenced by the vertical dashed line intersecting the Y-axis fairly close to −1.0.

Figure 12:
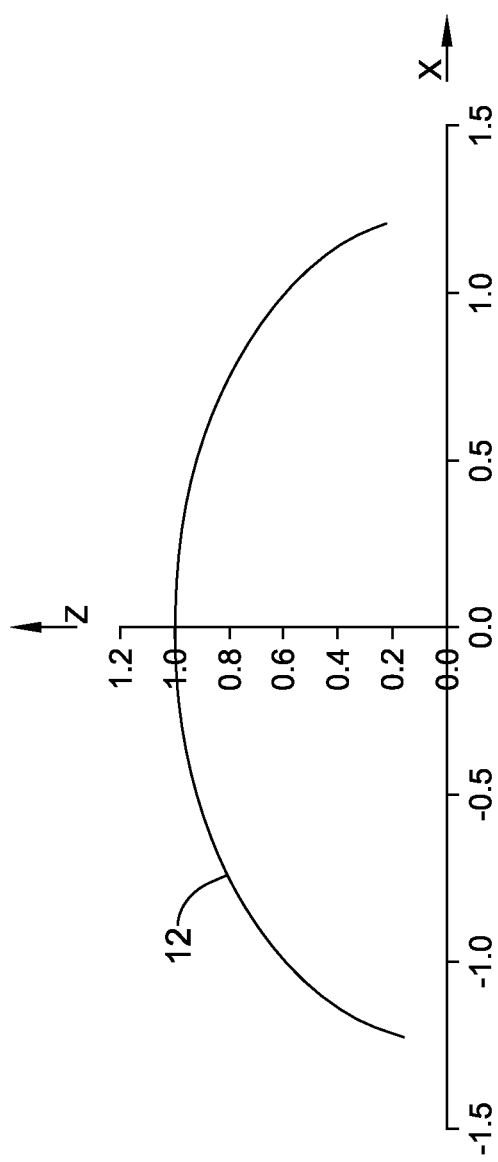
FIG. 12 is a plot of the surface profile of the outer face of the lens of FIG. 5, taken in cross-section through the X-Z plane.

FIG. 12 is a plot of the surface profile of the outer face 12 of the lens 10, taken in cross-section through the front-back plane FB, or equivalently, the X-Z plane.

The outer face 12 of the lens 10 may be left-right symmetric about the left-right plane LR. In terms of FIG. 12, such left-right symmetry is evident as being symmetric about the Z-axis of the plot. In some cases, the outer face 12 may have an on-axis thickness T, which is normalized to a value of unity along the vertical axis.

As seen in FIG. 12, in a cross-section taken along the front-back plane FB, the outer face 12 may be convex or flat everywhere and may extend radially away from the central axis CA by more than the on-axis thickness T.

Figure 13:
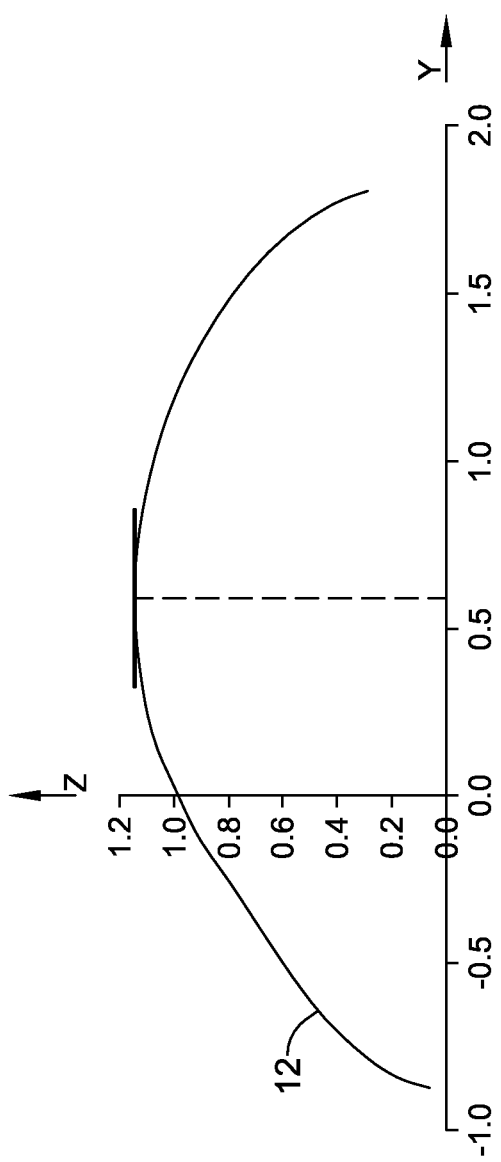
FIG. 13 is a plot of the surface profile of the outer face of the lens of FIG. 5, taken in cross-section through the X-Z plane.
Figure 14:
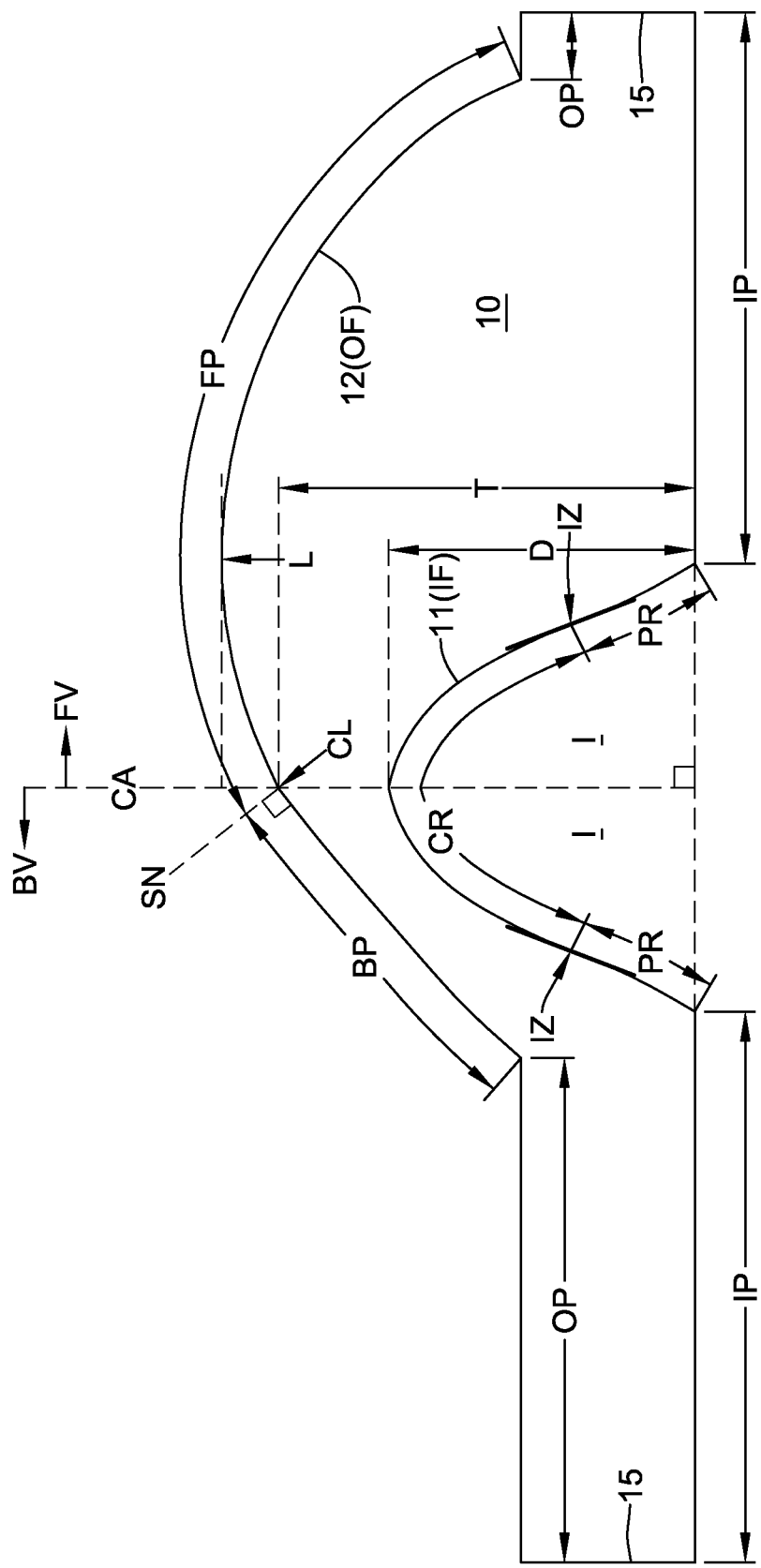
FIG. 14 is a cross-sectional drawing of the lens of FIG. 5, taken through the Y-Z plane, labeling the geometrical quantities used herein.

FIG. 13 is a plot of the surface profile of the outer face 12 of the lens 10, taken in cross-section through the left-right plane LR, or equivalently, the Y-Z plane.

The outer face 12 of the lens 10 may be asymmetric with respect to the front-back plane FB. In FIG. 13, as with FIG. 11, the front volume FV of the lens extends from the Z-axis to the right (Y>0), while the back volume BV of the lens extends front the Z-axis to the left (Y<0).

The outer face 12 may be convex or flat along the outer face 12 and may have a maximum protrusion at a location L laterally displaced from the central axis CA along the left-right plane LR in the front volume FV. The dark line in FIG. 13 indicates the local surface tangent at the maximum protrusion.

In some cases, the outer face 12 may have a front portion FP in the front volume FV (Y>0) that is convex everywhere. In some cases, the outer face 12 may have a back portion BP in the back volume BV (Y<0) that is convex or flat everywhere. In some cases, the front portion FP of the outer face 12 may include only one location L at which the outer face is perpendicular to the central axis CA, said location L being laterally displaced away from the central axis CA along the front-back plane FB.

As seen in FIG. 13, in a cross-section of the outer face 12 taken along the left-right plane LR, the front portion FP may extend radially away from the central axis CA by more than the on-axis thickness T and the back portion BP may extend radially away from the central axis CA by less than the on-axis thickness T.

Many of the geometrical constraints thus far have been primarily for the shapes and surface profiles of the inner 11 and outer 12 faces of the lens 10. There may be additional geometrical constraints that relate the inner 11 and outer 12 surfaces to the generally lateral planes that define their lateral boundaries.

FIG. 14 shows inner plane IP and outer plane OP, which extend from the lateral edges of the inner 11 and outer 12 faces, respectively, to a lateral, generally cylindrical face 15 of the lens. As with the lateral edge of the lens, the inner IP and outer OP planes of the lens primarily play a role in aligning, mounting and/or securing the lens, and play less of an optical role.

The inner plane IP may be useful in more precisely defining several of the quantities noted above. The inner plane IP may face the incident light 8. The lens 10 may have an inner face 11 recessed into the inner plane IP. The inner face 11 may have an on-axis depth D equal to the distance between the inner plane IP and the intersection of the inner face 11 with the central axis CA. The outer face 12 may have an on-axis thickness T equal to the distance between the inner plane IP and the intersection of the outer face 12 with the central axis CA.

The inner and outer planes may also be referred to as generally parallel planar flanges. In some cases, the lens 10 may be bounded by the inner and outer faces 11, 12, a pair of generally parallel planar flanges IP, OP extending laterally from the peripheries of the inner and outer faces 11, 12, respectively, and by a generally cylindrical face 15 connecting the flanges that defines a lateral edge of the lens 10.

Figure 15:
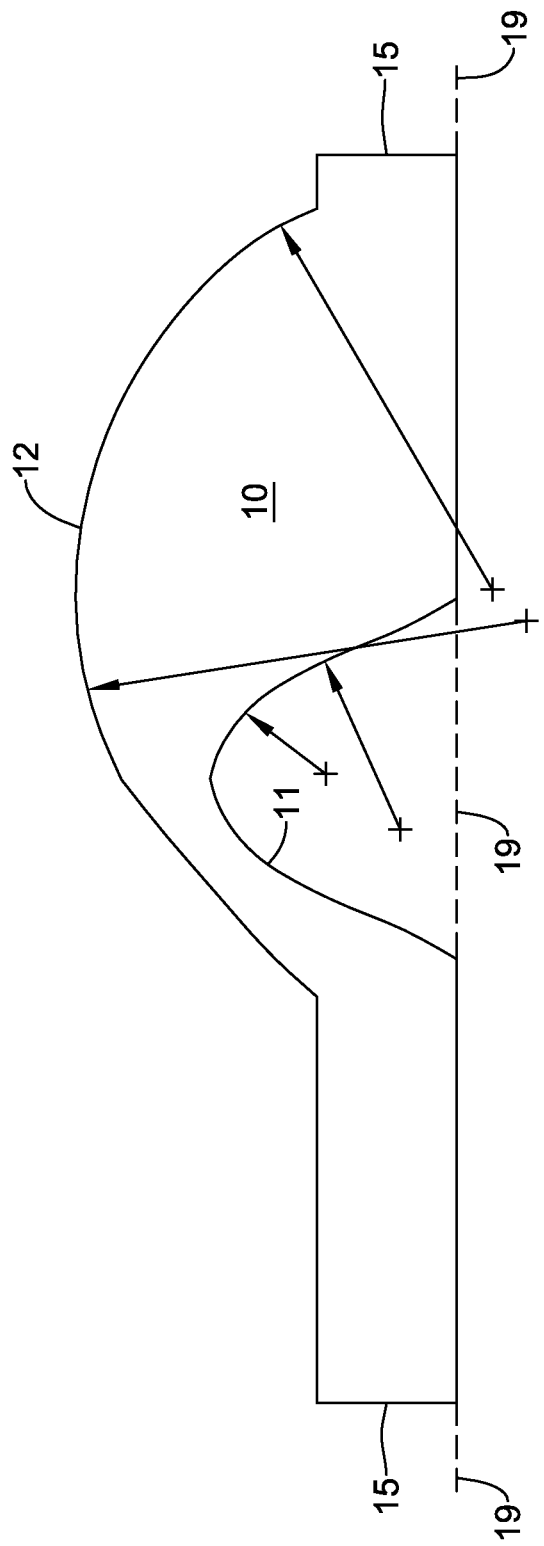
FIG. 15 is a cross-sectional drawing of the lens of FIG. 5, taken through the Y-Z plane, showing the locations of various centers of curvature.

There are various curvatures present in the shapes of the inner 11 and outer 12 faces of the lens 10. FIG. 15 is a cross-sectional drawing of the lens 10, taken through the left-right plane LR, showing the locations of various centers of curvature.

In some cases, the inner face 11 may have an interior I bounded by the inner face 11 and an inner-facing plane 19 of the lens 10. In some cases, at or near the central axis CA, the inner face 11 may have a center of curvature within the interior I of the inner face 11. In some cases, for at least one point on the outer face 12, the outer face 12 may have a center of curvature outside the lens 10 and beyond the inner-facing plane 19 of the lens 10.

The discussion thus far has concentrated on the actual shape of the lens 10 and the layout of the various elements in the light fixture. It is beneficial to briefly discuss the simulation stage of the system, which produces said shape and layout, and can also produce a simulated performance of the light fixture.

Simulation of the optical system may be done prior to the building or testing of any parts. Simulation is typically performed with a computer program that traces rays, usually from a source, such as the LEDs 2, to a target or image plane, such as the pavement. Rays are generally traced in a statistical manner, with an originating location and direction that are varied from ray to ray. Once a ray leaves the source, it refracts through surfaces and propagates between surfaces until it arrives at the target plane. Refraction and other physical phenomena may be treated by the raytrace program as well. When a ray arrives at the target plane, the location on the target plane may be noted and may be related back to the originating location and direction. The arrival locations may be tallied up statistically to produce an estimate for predicted illuminance at the street surface. The errors associated with the estimate typically decrease as the number of traced rays increases.

Figure 16:
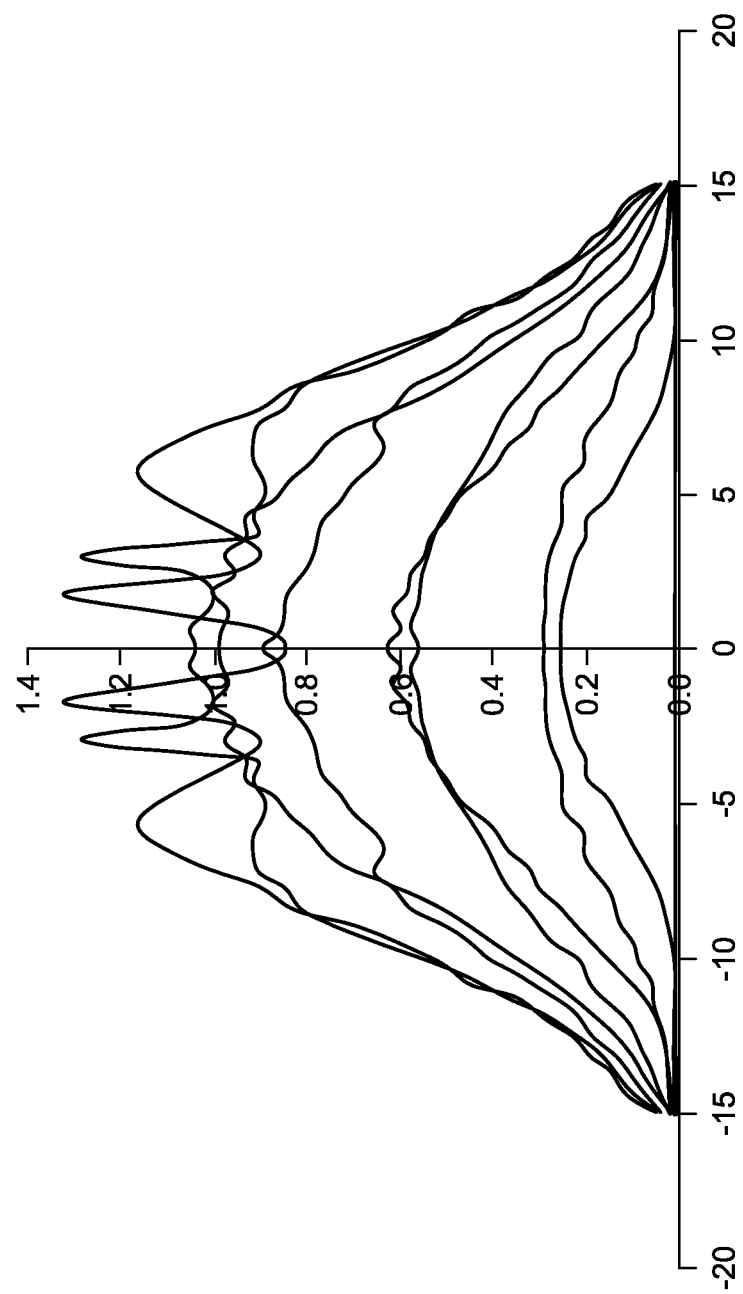
FIG. 16 is a plot of simulated illuminance at street level, taken in slices parallel to the X-Z plane, at various distances away from the curb of the street.

FIG. 16 is a plot of simulated illuminance at street level, taken in slices parallel to the X-Z plane, at various distances away from the curb of the street. The topmost curve corresponds to the "center" of the street in FIG. 1, with the other curves of decreasing peak value corresponding roughly to increasing distance away from the "center". Here, a symmetry is seen, so that as one drives along the street, the "ramp up"

of the light to the peak is essentially the same as the "ramp down" on the other side from the peak.

Figure 17:
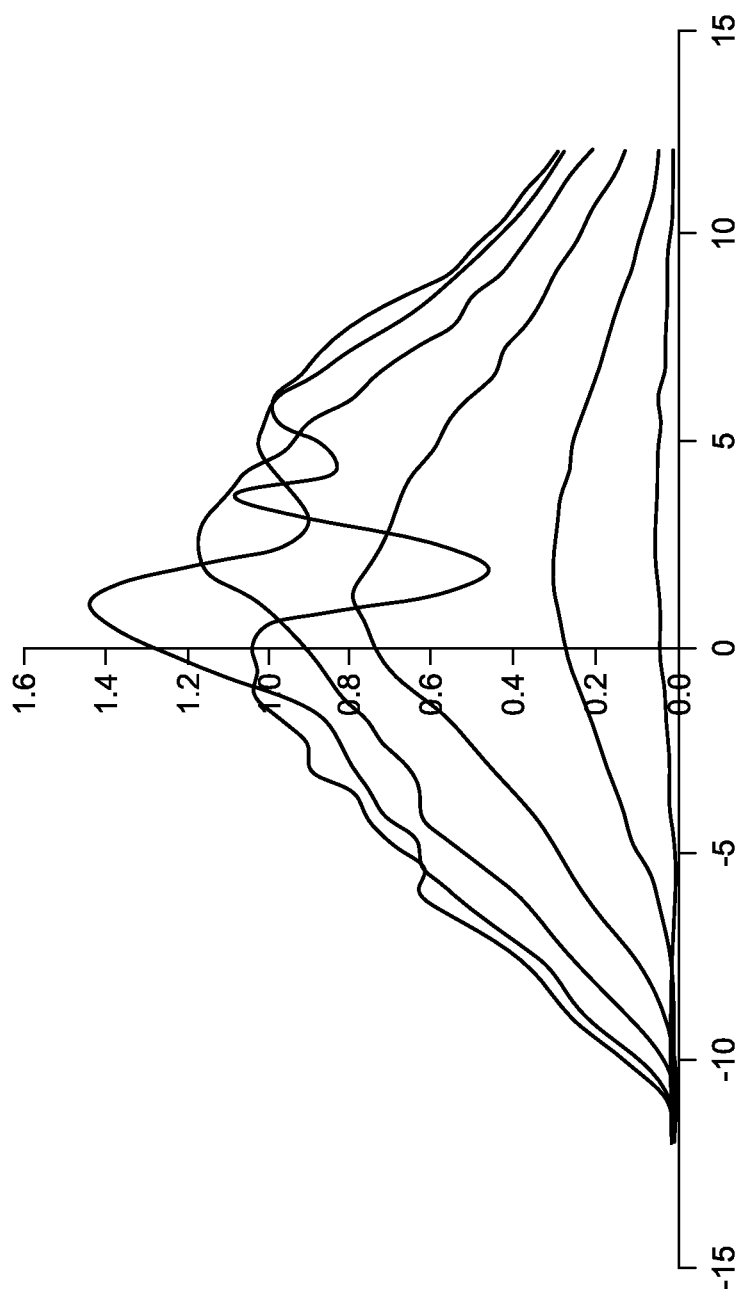
FIG. 17 is a plot of simulated illuminance at street level, taken in slices parallel to the Y-Z plane, at various longitudinal positions along the street.

FIG. 17 is a plot of simulated illuminance at street level, taken in slices parallel to the Y-Z plane, at various longitudinal positions along the street. The topmost curve correspond to the illuminance one would see by starting at the lamp post and walking across the street; the other curves correspond to starting points either farther up the street or farther down the street from the lamp post. Note a slight asymmetry, in that some of the peaks are shifted laterally more than others.

In general, the performance curves of FIGS. 16 and 17 are merely examples, and are intended to be representative of results produced by a typical raytrace program in the design phase of the light fixture.

Unless otherwise stated, use of the words "substantial" and "substantially" may be construed to include a precise relationship, condition, arrangement, orientation, and/or other characteristic, and deviations thereof as understood by one of ordinary skill in the art, to the extent that such deviations do not materially affect the disclosed methods and systems.

Throughout the entirety of the present disclosure, use of the articles "a" or "an" to modify a noun may be understood to be used for convenience and to include one, or more than one, of the modified noun, unless otherwise specifically stated.

Elements, components, modules, and/or parts thereof that are described and/or otherwise portrayed through the figures to communicate with, be associated with, and/or be based on, something else, may be understood to so communicate, be associated with, and or be based on in a direct and/or indirect manner, unless otherwise stipulated herein. Although the methods and systems have been described relative to a specific illustrative embodiment thereof, they are not so limited. Obviously many modifications and variations may become apparent in light of the above teachings. Many additional changes in the details, materials, and arrangement of parts, herein described and illustrated, may be made by those skilled in the art.

For convenience, a parts list follows, along with the associated element numbers in this document.

1 light redirection device
2 at least one light emitting diode
3 hemisphere
4 flat surface of the hemisphere
5 curved surface of the hemisphere
7 diverging light
8 incident light
9 output light
10 lens
11, IF inner face of the lens
12, OF outer face of the lens
15 cylindrical face of the lens
19 inner-facing plane of the lens
x, y, z coordinate system
BP back portion of the outer face of the lens
BV back volume
CA central axis
CL central location of the outer face of the lens
CR central region of the inner face of the lens
D on-axis depth of the inner face of the lens
FB front-back plane
FP front portion of the outer face of the lens
FV front volume
I interior of the inner face of the lens
IP inner plane of the lens
L location of maximum protrusion of the outer face of the lens
LR left-right plane
OP outer plane of the lens
PR peripheral region of the inner face of the lens
SN surface normal at the central location of the outer face of the lens

What is claimed is:

1. A light redirection device (1) having a central axis (CA), a front-back plane (FB) through the central axis (CA) that separates a front volume (FV) from a back volume (BV), and a left-right plane (LR) through the central axis (CA) and perpendicular to the front-back plane (FB), comprising:
   at least one light emitting diode (2) for producing diverging light (7) centered about the central axis (CA);
   a hemisphere (3) for receiving the diverging light (7) and producing incident light (8); and
   a lens (10) adjacent to and spaced apart by air from the hemisphere (3) for receiving the incident light (8) and producing output light (9) skewed toward the front volume (FV);
   the lens (10) having a recessed inner face (11) facing the hemisphere (3) that is generally symmetric with respect to the left-right plane (LR) and is asymmetric with respect to the front-back plane (FB), the inner face (11) having a concave central region (CR), a convex peripheral region (PR) and an inflection zone (IZ) between a central region (CR) and the peripheral region (PR),
   the lens (10) having an outer face (12) facing away from the hemisphere (3) that is generally symmetric with respect to the left-right plane (LR) and is asymmetric with respect to the front-back plane (FB), the outer face (12) being convex or flat along the outer face (12) and having a maximum protrusion at a location (L) laterally displaced from the central axis (CA) along the left-right plane (LR) in the front volume (FV).

2. The light redirection device (1) of claim 1,
   wherein the at least one light emitting diode (2) is disposed at or near a center of the hemisphere (3) and faces a flat surface (4) of the hemisphere (3); and
   wherein a curved surface (5) of the hemisphere (3) faces the inner face (11) of the lens (10).

3. The light redirection device (1) of claim 1,
   wherein the inner face (11) has an on-axis depth (D);
   wherein in a cross-section taken along the left-right plane (LR), the peripheral region (PR) of the inner face (11) is displaced away from the central axis (CA) by 40% to 80% of the on-axis depth (D) of the inner face (11) in the front volume (FV) and by more than the on-axis depth (D) of the inner face (11) in the back volume (BV); and
   wherein in a cross-section taken along the front-back plane (FB), the inflection zone (IZ) is displaced away from the central axis (CA) by 40% to 80% of the on-axis depth (D) of the inner face (11) and the peripheral region (PR) extends radially away from the central axis (CA) by 40% to 80% of the on-axis depth (D) of the inner face (11).

4. The light redirection device (1) of claim 1,
   wherein the front-back plane (FB) divides the outer face into a front portion (FP) and a back portion (BP);
   wherein the outer face (12) has an on-axis thickness (T);
   wherein in a cross-section taken along the left-right plane (LR), the front portion (FP) extends radially away from the central axis (CA) by more than the on-axis thickness (T) and the back portion (BP) extends radially away from the central axis (CA) by less than the on-axis thickness (T), and
   wherein in a cross-section taken along the front-back plane (FB), the outer face (12) is convex or flat everywhere and extends radially away from the central axis (CA) by more than the on-axis thickness (T).

5. The light redirection device (1) of claim 1,
wherein the inner face (11) has an interior (I) bounded by the inner face (11) and an inner-facing plane (19) of the lens (10);
wherein at or near the central axis (CA), the inner face (11) has a center of curvature within the interior (I) of the inner face (11); and
wherein for at least one point on the outer face (12), the outer face (12) has a center of curvature outside the lens (10) and beyond the inner-facing plane (19) of the lens (10).

6. A light redirection device (1) having a central axis (CA), a front-back plane (FB) through the central axis (CA) that separates a front volume (FV) from a back volume (BV), and a left-right plane (LR) through the central axis (CA) and perpendicular to the front-back plane (FB), comprising:
a lens (10) for receiving incident light (8) centered around the central axis (CA) and transmitting output light (9) skewed toward the front volume (FV);
the lens (10) having an inner plane (IP) facing the incident light (8),
the lens (10) having an inner face (11) recessed into the inner plane (IP),
the inner face (11) having an on-axis depth (D) equal to the distance between the inner plane (IP) and the intersection of the inner face (11) with the central axis (CA),
the inner face (11) being concave in a central region (CR) surrounding the central axis (CA),
the inner face (11) having an inflection zone (IZ) surrounding the central region (CR),
the inner face (11) being convex in a peripheral region (PR) surrounding the inflection zone (IZ),
wherein in a cross-section taken along the left-right plane (LR), the peripheral region (PR) is displaced away from the central axis (CA) by 40% to 80% of the on-axis depth (D) of the inner face (11) in the front volume (FV) and by more than the on-axis depth (D) of the inner face (11) in the back volume (BV),
wherein in a cross-section taken along the front-back plane (FB), the inflection zone (IZ) is displaced away from the central axis (CA) by 40% to 80% of the on-axis depth (D) of the inner face (11) and the peripheral region (PR) extends radially away from the central axis (CA) by 40% to 80% of the on-axis depth (D) of the inner face (11),
the lens (10) having an outer face (12) opposite the inner face (11),
the outer face (12) having an on-axis thickness (T) equal to the distance between the inner plane (IP) and the intersection of the outer face (12) with the central axis (CA),
the outer face (12) having a front portion (FP) in the front volume (FV) that is convex everywhere,
the outer face (12) having a back portion (BP) in the back volume (BV) that is convex or flat everywhere,
the front portion (FP) of the outer face (12) including only one location (L) at which the outer face is perpendicular to the central axis (CA), said location (L) being laterally displaced away from the central axis (CA) along the front-back plane (FB),
wherein in a cross-section taken along the left-right plane (LR), the front portion (FP) extends radially away from the central axis (CA) by more than the on-axis thickness (T) and the back portion (BP) extends radially away from the central axis (CA) by less than the on-axis thickness (T), and
wherein in a cross-section taken along the front-back plane (FB), the outer face (12) is convex or flat everywhere and extends radially away from the central axis (CA) by more than the on-axis thickness (T).

7. The light redirection device (1) of claim 6, wherein the lens (10) is generally symmetric about the left-right plane (LR) and asymmetric about the front-back plane (FB).

8. The light redirection device (1) of claim 6,
wherein the inner face (11) has an interior (I) bounded by the inner face (11) and the inner plane (IP); and
wherein at or near the central axis (CA), the inner face (11) has a center of curvature within the interior (I) of the inner face (11).

9. The light redirection device (1) of claim 6, wherein for at least one point on the front portion (FP) of the outer face (12), the outer face (12) has a center of curvature outside the lens (10) and beyond an inner-facing plane (19) of the lens (10).

10. The light redirection device (1) of claim 6, further comprising:
at least one light emitting diode (2) that produces diverging light (7); and
a hemisphere (3) for receiving the diverging light (7) and producing the incident light (8).

11. The light redirection device (1) of claim 10,
wherein the at least one light emitting diode (2) is disposed at or near a center of the hemisphere (3); and
wherein a curved surface (5) of the hemisphere (3) is directly adjacent to and is spaced apart by air from the inner face (11) of the lens (10).

12. The light redirection device (1) of claim 11,
wherein the diverging light (7) and the incident light (8) are both rotationally symmetric about the central axis (CA); and
wherein the incident light (8) is distributed more narrowly than the diverging light (7).

13. The light redirection device (1) of claim 6, wherein the lens (10) is bounded by the inner and outer faces (11, 12), a pair of generally parallel planar flanges (IP, OP) extending laterally from the peripheries of the inner and outer faces (11, 12), respectively, and by a generally cylindrical face (15) connecting the flanges that defines a lateral edge of the lens (10).

14. A method for redirecting light having a central axis (CA), a front-back plane (FB) through the central axis (CA) that separates a front volume (FV) from a back volume (BV), and a left-right plane (LR) through the central axis (CA) and perpendicular to the front-back plane (FB), comprising:
receiving diverging light (7), the diverging light (7) being rotationally symmetric about the central axis (CA);
narrowing the diverging light (7) through a hemisphere (3) to form incident light (8);
transmitting the incident light (8) from the hemisphere (3) through air;
receiving the incident light (8) at an inner face (11) of a lens (10), the inner face (11) being generally symmetric with respect to the left-right plane (LR) and being asymmetric with respect to the front-back plane (FB);
refracting the received incident light (8) through the inner face (11) of the lens (10) to form internal light, the internal light being skewed toward the front volume (FV);
transmitting the internal light to an outer face (12) of the lens (10), the outer face (12) being generally symmetric with respect to the left-right plane (LR), being asymmetric with respect to the front-back plane (FB) and being convex or flat on the outer face (12);

refracting the transmitted internal light through the outer face (12) of the lens (10) to form output light (9), the output light (9) being skewed toward the front volume (FV); and transmitting the output light (9) from the lens (10).

15. The method of claim 14, wherein the inner face (11) has a concave central region (CR) and a convex peripheral region (PR); and wherein the outer face (12) has a maximum protrusion at a location (L) laterally displaced from the central axis (CA) along the left-right plane (LR) in the front volume (FV).

* * * * *